United States Patent [19]
Gorman et al.

[11] 3,972,251
[45] Aug. 3, 1976

[54] ADJUSTABLE LATHE TEMPLATE

[75] Inventors: Thomas E. Gorman, Springfield, Mass.; Frederick O. Raley, Bristol, Conn.

[73] Assignee: United Technologies Corporation, Hartford, Conn.

[22] Filed: Sept. 2, 1975

[21] Appl. No.: 609,859

[52] U.S. Cl. .................................. 82/14 R; 82/17
[51] Int. Cl.² .......................... B23B 3/28; B23B 3/36
[58] Field of Search ............................. 82/14 R, 17

[56] References Cited
UNITED STATES PATENTS

| | | | |
|---|---|---|---|
| 1,195,293 | 8/1916 | Townsend | 82/14 R |
| 1,616,152 | 2/1927 | Thacher | 82/17 |
| 2,978,939 | 4/1961 | Von Zelewsky | 82/14 R |
| 3,133,464 | 5/1964 | Bell | 82/14 R |
| 3,309,950 | 3/1967 | Weaver | 82/14 R |
| 3,373,640 | 3/1968 | Allen, Sr. et al. | 82/14 R |

*Primary Examiner*—Harrison L. Hinson
*Attorney, Agent, or Firm*—Norman Friedland

[57] ABSTRACT

An adjustable template for a lathe has a pair of pivotable arms extending from a circular or partially circular center post which are disposed so that the edge of each arm lies tangential to the circumference forming a pattern for the stylus of the automatic feed to trace whereby the cutting tool machines two angles with respect to the center line and a radius therebetween in the workpiece. Adjustment of the arms determines the angles and the diameter of the stylus determines the radius.

9 Claims, 8 Drawing Figures

ADJUSTABLE LATHE TEMPLATE

BACKGROUND OF THE INVENTION

This invention relates to templates and more particularly to templates for a lathe having an automatic feed for machining a workpiece into contours having two angles and an interconnecting radius.

Heretofore, each job for the machining of an automatic feed lathe of two sides of any lathe turned surface with a connecting radius required a special solid template. Thus the angle of each side and the radius therebetween of the machined piece was preascertained and inscribed in a solid template. Where the job called for many turned pieces, a solid template is satisfactory and perhaps, preferred. However, if the job is special requiring a limited number of pieces, the use of a solid template with the attendant limited use is unattractive. In heretofore practice, this solid template was inventoried to be reused whenever a similar job presented itself, if ever, or was discarded.

We have found that we can obviate the problem noted above and provide a multi-use or universal template for achieving this end. It is contemplated by this invention that an adjustable template for a male radius (convex) or a female radius (concave) can be attained by making the template to be comprised of a base plate, a pair of pivotable arms overlying the plate, and cooperating with a central, circumferential member so arranged that the edge of each arm lies tangential thereto so as to form a continuous tracing for the cooperating stylus.

In the instance of the female radius, the central circumferential member is a segmented circumference mounted on a rotatable platform and forming an arc that is equal to or less than 180° so that it can be rotated so that one arm and then the other lies tangential thereto.

SUMMARY OF THE INVENTION

An object of this invention is to provide an improved template for a lathe.

A still further object of this invention is to provide an adjustable template for a lathe that serves as a pattern for a stylus to trace for machining two sides of different angles with respect to the center line and an interconnecting radius, the angles determined by the setting of the arms of the template and the radius determined by the size of the stylus.

A still further object of this invention is to provide an adjustable template as described where, in one embodiment, the center post about which the pair of cooperating arms rotate is circular and fixed and in another embodiment the center is rotated and includes an arc of 180° or less so that it is adjustable with respect to the cooperating arms so that one arm and then the other lies tangential thereto. In the fixed post template the stylus traces the outer edge of the arms and post for machining a convex radius and in the rotating post template the stylus traces the inner edges of the arms and post for machining a concave radius.

Other features and advantages will be apparent from the specification and claims and from the accompanying drawings which illustrate an embodiment of the invention.

DESCRIPTION OF THE PREFERRED EMBODIMENT

Figure 1:
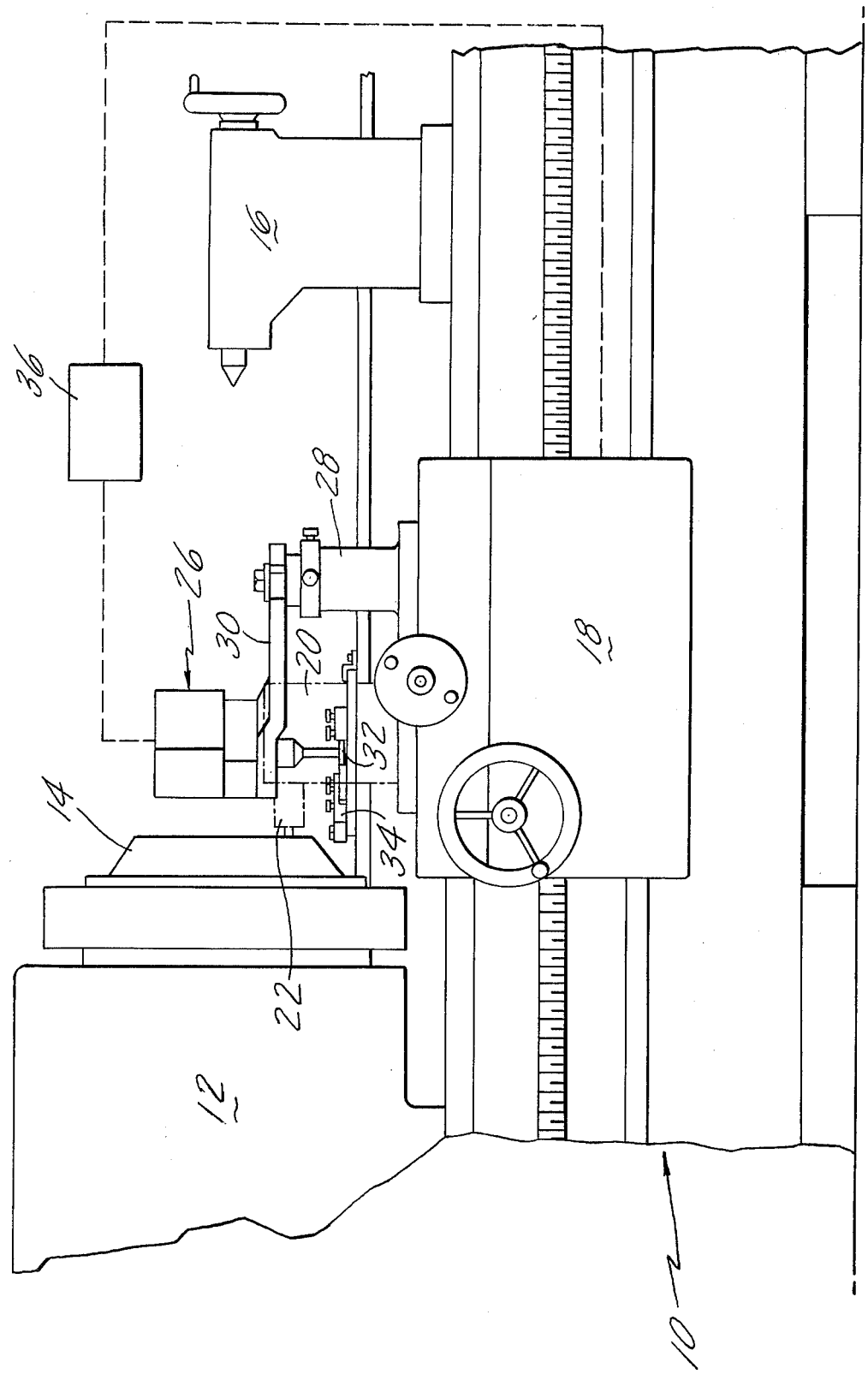
FIG. 1 is a partial view in elevation and schematic illustrating the relationship of the cutting tool, the workpiece, the template and the lathe.

Reference is now made to FIG. 1 showing a typical commercially available automatic feed lathe illustrated by numeral 10 having the customary head stock 12 holding workpiece 14, tail stock 16 (not being utilized although for other pieces it would be), carriage 18 carrying the tool holder 20 and tool 22 (both in phantom). The tracer generally illustrated by reference numeral 26 is also commercially available as for example a suitable type is the Scan-o-matic Hydraulic Tracer manufactured by Scan-o-matic Inc. of Racine, Wisconsin which has a follower 28 attached to the carriage 18 and includes a pivotable arm 30 carrying stylus 32 that traces template 34 which is grounded to a fixed part of the lathe. The pivotable arm 30 relays the position signal picked up by the stylus to the control represented by the blank box 36 and through suitable means relays the signal to the carriage for automatically controlling the longitudinal and cross feeds of the lathe. Thus the lathe with a suitable template can cut any two dimensional contour on a workpiece. As this aspect of the automatic lathe is well known and not a part of the invention details thereof have been omitted for the sake of clarity and simplicity. Inasmuch as the invention relates to the template the description to follow will pertain thereto.

Figure 2:
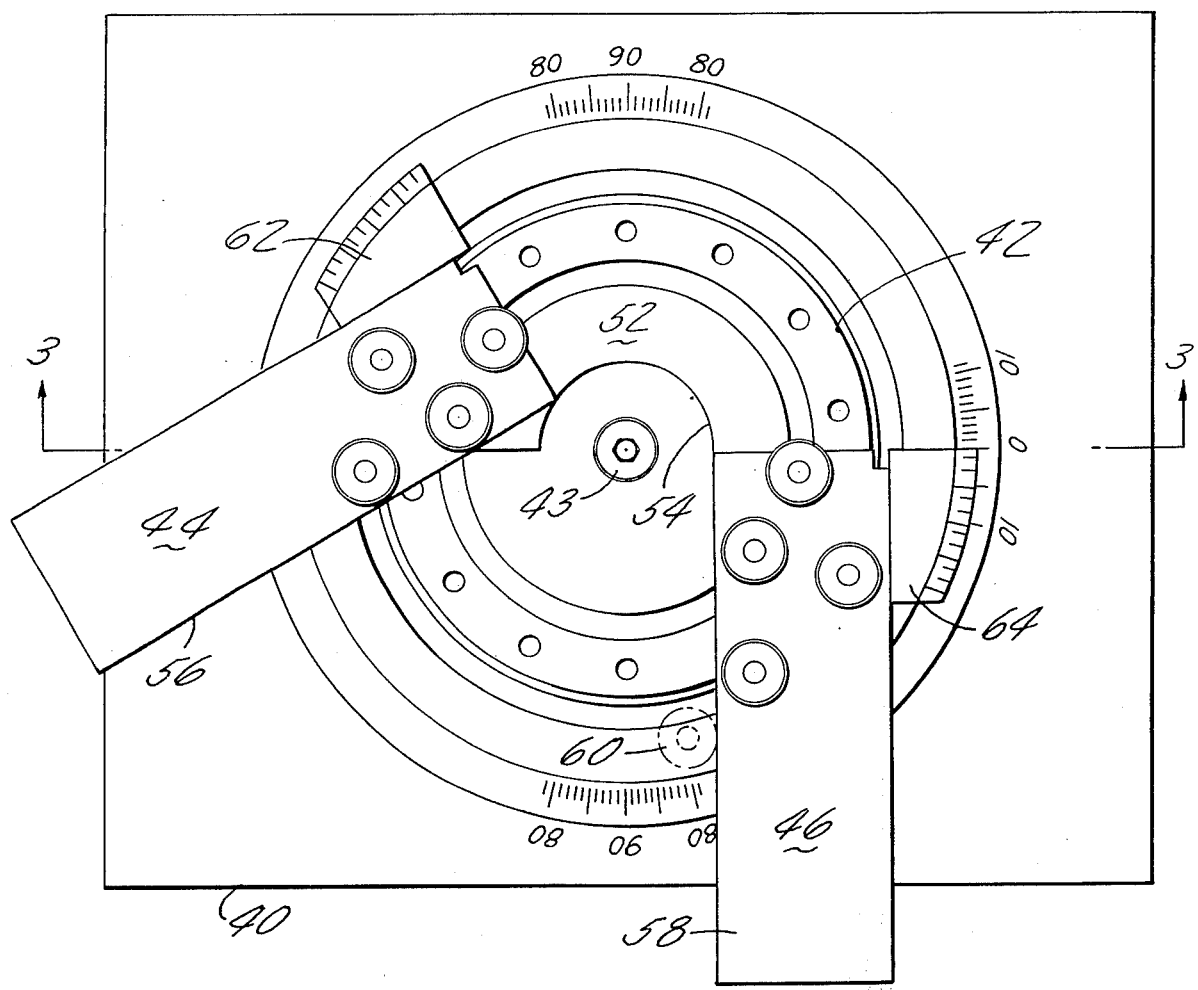
FIG. 2 is a plan view showing the preferred embodiment of a template.
Figure 3:
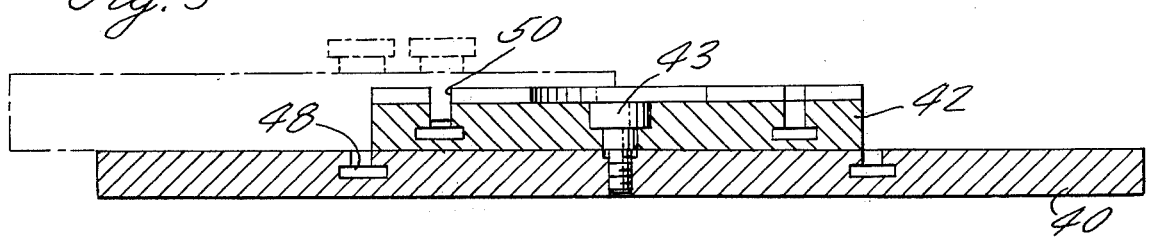
FIG. 3 is a sectional view taken along line 3—3 of FIG. 2 with one of the adjusting arms removed and the other shown in phantom for clarity.

As can be seen in FIGS. 2 and 3, the template comprises base plate 40 and rotatable center post 42 rotatably supported by pin 43 and a pair of rotatable arms 44 and 46 extending therefrom. Arms 44 and 46 are similarly constructed and as viewed from its side elevation (FIG. 3) it is stepped to overlie base plate 40 and the raised center post 42. Depending guides are fixed to each leg and extend into annular slot 48 formed in base plate 40 and annular slot 50 formed in post 42. The guides may be tightened by knurled headed screws to hold the arms secure in place. The semicircular raised portion of post 42 is formed with a semicircular inner arc defining a tracing surface 54 and is adapted to lie tangent to the tracing edges 56 and 58 of arms 44 and 46 respectively.

It is apparent from the foregoing that the stylus 60 shown in phantom rides along the edges 56, 54 and 58 forming the pattern for the lathe to machine the workpiece. In order for each edge of each arm to lie tangent to the arcuate surface 54, the center post must be rotated while the stylus is riding along in the arcuate surface 54 and is typically done while the machining operation is in progress. It will be noted that this portion of the template defines the radius of the workpiece in between the sides defined by arms 44 and 46 and since its radius is constant the center post 42 may be rotated without affecting any dimensional change.

Each arm may carry gauges 62 and 64 which are indexable with a gauge formed in the base plate to facilitate the setting of each arm.

The dimensions of the radius of the workpiece is determined by the diameter of the stylus and for a given template size a simple formula can be utilized.

For a 1.000 inch constant radius arcuate section 54 as shown in this preferred embodiment, the following is illustrative (all dimensions are in inches)

1. subtract the radius required from the radius of arcuate section 54
2. add the deflection constant to the diameter of the tool
3. add the diameter of the resultant radius obtained in 1) to the total obtained in 2)

For example, with a given radius of 1.000 of the arcuate section 54 and a 0.625 radius in workpiece required.

Figure 4:
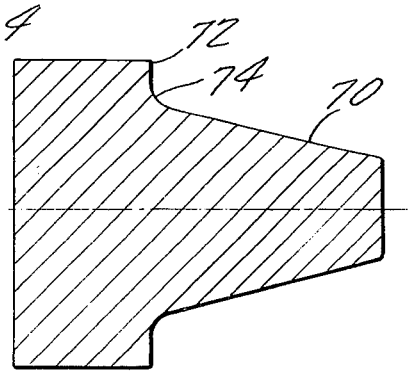
FIG. 4 is a sectional view illustrating a machined workpiece as an example of a use of the template.

1. $1.000 - 0.625 = 0.325$
2. $(0.0465 \text{ (radius tool)} \times 2) + 0.020 \text{ (deflection constant)} = 0.113$
3. $(0.375 \times 2) + 0.113 = 0.863$ stylus diameter As was shown in the embodiment in FIG. 2 stylus 58 enters the curvature 54 at a tangent, the center disc 42 is rotated once the stylus is bearing against the surface of the arc so that the stylus exits on the tangent. In this embodiment the stylus rides on the inner side of the arms with respect to the center line and is adapted to serve as a pattern for a concave radius as shown in FIG. 4. The example of a machined workpiece illustrated in FIG. 4 shows the two angles of the sides 70 and 72 and the interconnecting radius 74 automatically cut by the lathe by use of the template described immediately above.

Figure 5:
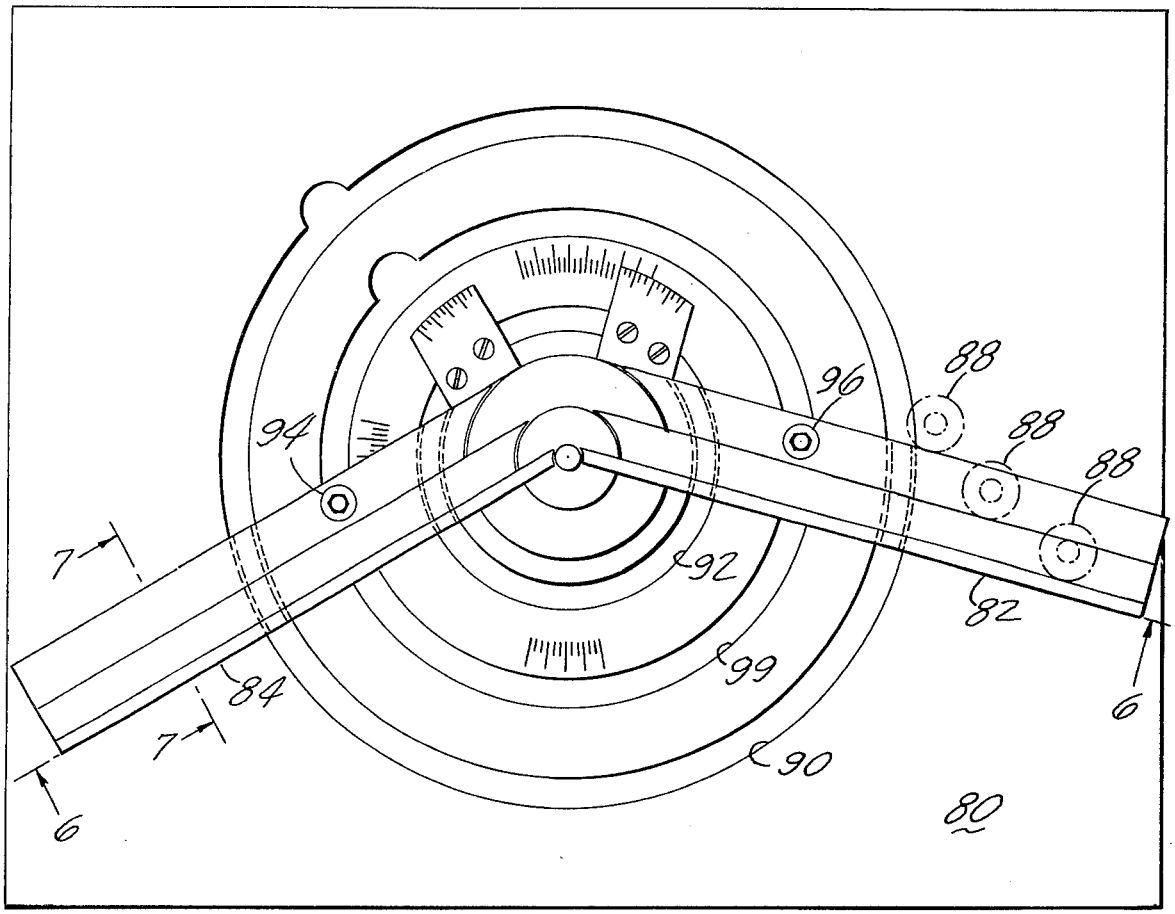
FIG. 5 is a plan view illustrating another template.
Figure 6:
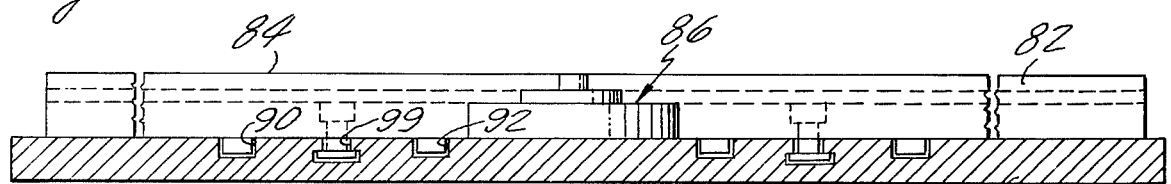
FIG. 6 is a sectional view taken along lines 6—6 of FIG. 5.
Figure 7:
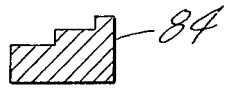
FIG. 7 is a sectional view of the only arm taken along line 7—7 of FIG. 5.

FIGS. 5 and 6 disclose a similar template contemplated by this invention where the template serves as a pattern for the lathe to machine a convex radius. The template comprises plate 80, a pair of rotating arms 82 and 84 and stationary post 86, lying in a common center line with each arm. Post 86 is formed in three tiers and the top of each leg is stepped so that the edge of each step lies coplanar with and tangential to the corresponding tier of the center post. As shown stylus 88 may ride in a given step depending on the radius desired. The diameter of the stylus may also be selected to give additional flexibility in size. Where the embodiment in FIG. 7 has limitations to the sizes of the radius owing to the inner dimension of the arcuate surface 54 (FIG. 2), this embodiment has no such limitations. Arms 82 and 84 are keyed to the base plate 80 by suitable depending guides riding in annular slots 90 and 92 formed therein and set screws 94 and 96 carrying locking member 97 riding in annular groove 99 serve to lock the arms in place, once the angle is set. A suitable scale may be incorporated for facilitating the setting of the angles of each arm.

Figure 8:
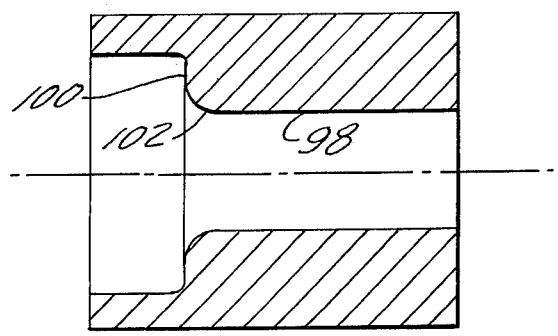
FIG. 8 is a sectional view illustrating a machined workpiece as an example of a use of the template.

As depicted in FIG. 8 an example of a workpiece is shown where the template could be used to automatically machine sides 98 and 100 and the interconnecting radius 102.

It should be understood that the invention is not limited to the particular embodiments shown and described herein, but that various changes and modifications may be made without departing from the spirit or scope of this novel concept as defined by the following claims.

We claim:

1. An adjustable template for controlling an automatic feed of a lathe to position its cutting tool so as to cut into the workpiece two angles and an interconnecting radius, said template including a flat base member, upstanding member having at least a partially circumferential edge, a pair of bar members rotatably supported to said base member and having a straight working edge that lies tangential to said partially circumferential edge, all of said edges defining the pattern cut by the cutting tool of said lathe which pattern includes a first and second angle and an interconnecting radius, means for tracing said pattern including a stylus following said edges, and retractable means for securing each of said bar members once the preselected first and second angles have been adjusted.

2. An adjustable template as claimed in claim 1 wherein said stylus includes a replaceable follower the size of said follower being related to the dimension of said radius.

3. An adjustable template designed to serve as a pattern for a stylus to follow for an automatic feed lathe for cutting two angles and an interconnecting radius in the workpiece, said template including a flat base member, a rotatable disc supported to said flat base member, an upstanding arcuate shaped member having an arcuate inner surface carried by said rotatable disc, a pair of arms movable relative to said flat base plate and said rotatable disc supported to said flat base member and said rotatable disc, each of said arms having a straight edge surface adapted to lie tangentially to said arcuate inner surface, means for securing said arms to said flat base plate and said rotatable disc independently of each other, whereby said disc can be rotated so that one of said arms lies tangential to said arcuate inner surface during one portion of the cutting operation and said other arm lies tangential to said inner arcuate surface during the other portion of the cutting operation by rotating said rotatable disc while the arms are secured to said flat base member.

4. An adjustable template as claimed in claim 3 including concentric slots in said flat base member and said rotatable disc, and depending members in said arms fitted into said slots to be supported and aligned thereby relative to said arcuate surface.

5. An adjustable template as claimed in claim 3 including a scale on said flat base member and an indicator on each of said arms bearing a relation to said workpiece so that each arm is set to the angle desired on the workpiece.

6. A universal template for positioning the cutting tool positioned by an automatic feed of a lathe so as to cut into the workpiece two angles and an interconnecting radius, said template including a flat base member, an upstanding central circumferential member having a circumferential edge, a pair of bar members rotatably supported to said base member having an axis common to said circumferential edge and having a straight working edge that lies tangential to said circumferential edge, all of said edges defining the pattern cut by the cutting tool of said lathe which pattern includes a first angle, a joining radius, and a second angle, means for tracing said pattern including a stylus following said edges, and retractable means for securing each of said bar members once the preselected angles have been adjusted.

7. A universal template as claimed in claim 6 wherein said central member is stepped for defining at least two circumferential edges, said bar members also stepped so that each step lies coplanar with a corresponding step of said central member, and the dimension of said step bearing a given relationship to the desired size of said workpiece.

8. A universal template as claimed in claim 7 including concentric grooves coaxially mounted with respect to the axis of said central member, and means on said bar members slidable in said grooves, and means for securing said bar members into a fixed position.

9. A universal template as claimed in claim 6 including a gauge carried by each of said bar members having a given relationship to said flat base member and the workpiece to set the angles of the sides of the pieces to be cut.

* * * * *